United States Patent [19]
Bourges

[11] Patent Number: 5,161,974
[45] Date of Patent: Nov. 10, 1992

[54] COLOR SYSTEM

[76] Inventor: Jean Bourges, 20 Waterside Plz., New York, N.Y. 10010

[21] Appl. No.: 826,107

[22] Filed: Jan. 27, 1992

[51] Int. Cl.$^5$ .............................................. G09B 19/00
[52] U.S. Cl. ........................................................ 434/98
[58] Field of Search ..................................... 434/98, 84

[56] References Cited

U.S. PATENT DOCUMENTS

| | | | |
|---|---|---|---|
| 1,753,619 | 4/1930 | Norberg | 434/98 |
| 3,474,546 | 10/1969 | Wedlake | 434/98 |
| 4,796,888 | 1/1989 | Louez | 434/98 |
| 5,033,963 | 7/1991 | Bourges | 434/98 |

Primary Examiner—Gene Mancene
Assistant Examiner—Cindy A. Cherichetti
Attorney, Agent, or Firm—Charles E. Temko

[57] ABSTRACT

A color value classification system particularly suited for use in printing procedures based upon the cyan, magenta and yellow primary colors, including both traditional and digital color separation methods, as well as all types of other printing systems. The classification is based upon four groups of five colors each, in which half of the colors are the substan- tial complements of the remaining half. The twenty colors are derived from the blending of the basic primary colors known as process colors in the printing industry.

1 Claim, 2 Drawing Sheets

| I | II | III | IV |
|---|---|---|---|
| 100% | 100% | 100% | 100% |
| 50% | 50% | 50% | 50% |
| 25% | 25% | 25% | 25% |
| 10% | 10% | 10% | 10% |
| 5% | 5% | 5% | 5% |

COLOR SYSTEM

BACKGROUND OF THE INVENTION

This invention relates generally to the field of standardized color systems, and more particularly to an improved technology by means of which reproducible colors are identified and related to a standard primarily in terms of hue and tint.

The prior art systems typically comprise a variety of representations of very large numbers of hues and tints, each having an identifying number or symbol. Such systems do, in fact, provide means for identification, but lose sight of the fact that not all of the many colors employed by artists are readily reproducible in various color mediums for purpose of reproduction. While small lots of paints and similar coatings are routinely prepared, the reproduction of colors on a printed page normally requires very precise printing inks which cannot be economically produced in large quantities, in more than a relatively limited number of colors. This is equally true in the case of the manufacture of other color materials, such as paints, pencils, color sheets, colored paper, acrylics, water colors, and airbrush colors.

As a result, it is often difficult to reproduce with any reasonable degree of fidelity the work product of an artist who has used a random assortment of colors in the creation of a work, with a corresponding loss in visual accuracy in the reproduction. Although computer technology has permitted the accurate identification of literally millions of hues and tints comprising the visible spectrum, the reproduction of such variations is still a matter of costly color matching using relatively complex technologies. Materials have been improved in recent years to permit increased brightness, resistance to fading, and other desirable characteristics. These improved qualities do not simplify ready reproductions of a desired color. It is known to use standard color sheets for producing original art copy, but, lacking a fully comprehensive standardized color system, the use of these sheets has resulted in limitations in reproduction.

In my prior U.S. Pat. No. 5,033,963 dated Jul. 23, 1991, there is disclosed a color system in which a group of twenty basic hues and accompanying percentage tints is used to permit the reproduction of the colors in commercially usable forms, the twenty basic hues extending substantially over the entire visible spectrum, and being chosen such that one-half of these hues are the substantial complementary colors of the other half. By limiting the number of basic hues to twenty, it is necessary for the printing establishment to carry in stock colored inks corresponding to the basic hues from which percentage tints can be readily obtained. With the use of a relatively small number of color variants, the teaching of color is materially simplified, and the translation of art copy into forms for convenient replication is facilitated.

The principles of the color system described in my above-mentioned patent have met with approval from many sources. The total of twenty hues provides a practical well-balanced working palette for the artist, and the warm/cool combinations and the color complements are easy to use and understand by almost everyone. Additionally, the printing establishment need maintain only a relatively few number of ink colors which correspond to these hues.

While such system provides a substantial improvement over previously used systems, it is desirable that a system of this type be adaptable to the colors which are widely used in CMY process reproduction, which are included in the principal colors known as No. 16 cyan, No. 2 magenta, and No. 10 yellow. Such a system permits the accurate reproduction at low cost of works using all of the twenty hues wherein all of the colors are obtained using only three process inks, and in which the colors are mechanically separated by known photographic and/or electronic techniques. In the past, the quality and color control has not been sufficient. This has been improved in recent years using digital separations which are electronically scanned to obtain more accurate values. In addition, process printing inks are considerably brighter, cleaner, and more permanent than in the past, making their use far more desirable than as heretofore been the case. Also, the costs are reduced because the separations and printing production has been greatly simplified. In addition, the computer images can be programmed with the CMY (cyan, magenta, yellow) codes and translated internally to the RGB (red, green, blue) data when necessary. For the first time this makes color information and communication a connected understandable language that functions smoothly back and forth and in between all these diverse applications, the arts, copiers, computers, film, video and graphic arts.

SUMMARY OF THE INVENTION

Briefly stated, the present invention contemplates the use of the color system described in my above-mentioned prior patent in conjunction with primary color process printing inks, in addition to the previously employed printing inks of twenty precisely controlled hues. The advantages to the artist and student remain the same, but the replication of art copy is materially simplified by the fact that inks of standardized primary colors are far more readily available to the printer. These inks can be blended by the printing establishment using established parts by volume to obtain the standardized twenty hues of my system with a remarkable degree of accuracy. This is accomplished by choosing the twenty hues from a process color base at the beginning, rather than by just creating the colors and then accepting the best match possible with process printing inks corresponding to those colors. This procedure permits the preparation of art work which will be computer imaged by equipment which also employs a three color base. Although minor adjustments are required with respect to some of the hues, this convenience is far offset by the many advantages to the artist who can be sure that all of the colors he now employs can be accurately duplicated by this use of previously established color values.

The present system contemplates inks which are "transparent" as employed in most printing and computer technology. The colors are obtained by layering various transparent colors over the others to provide a composite result. The callibration data for the CMY process mixtures can only be used with transparent inks. Opaque colors block out the under colors. The individual colors can be made opaque, but the quality of the color is changed, similar to the effect of adding cream to coffee. An opaque red can b mixed with an opaque yellow to obtain an orange color but it will not be the same color match as achieved with transparent colors.

BRIEF DESCRIPTION OF THE DRAWINGS

In the drawings, to which reference will be made in the specification.

DETAILED DESCRIPTION OF THE DISCLOSED EMBODIMENT

The present invention, which constitutes an improvement over my earlier system, maintains the establishment of four basic color groups, each color group comprising five hues. Each hue is assigned a sequential ordinal number, commencing with the reds, and terminating with the blues.

Figures 1, 2:
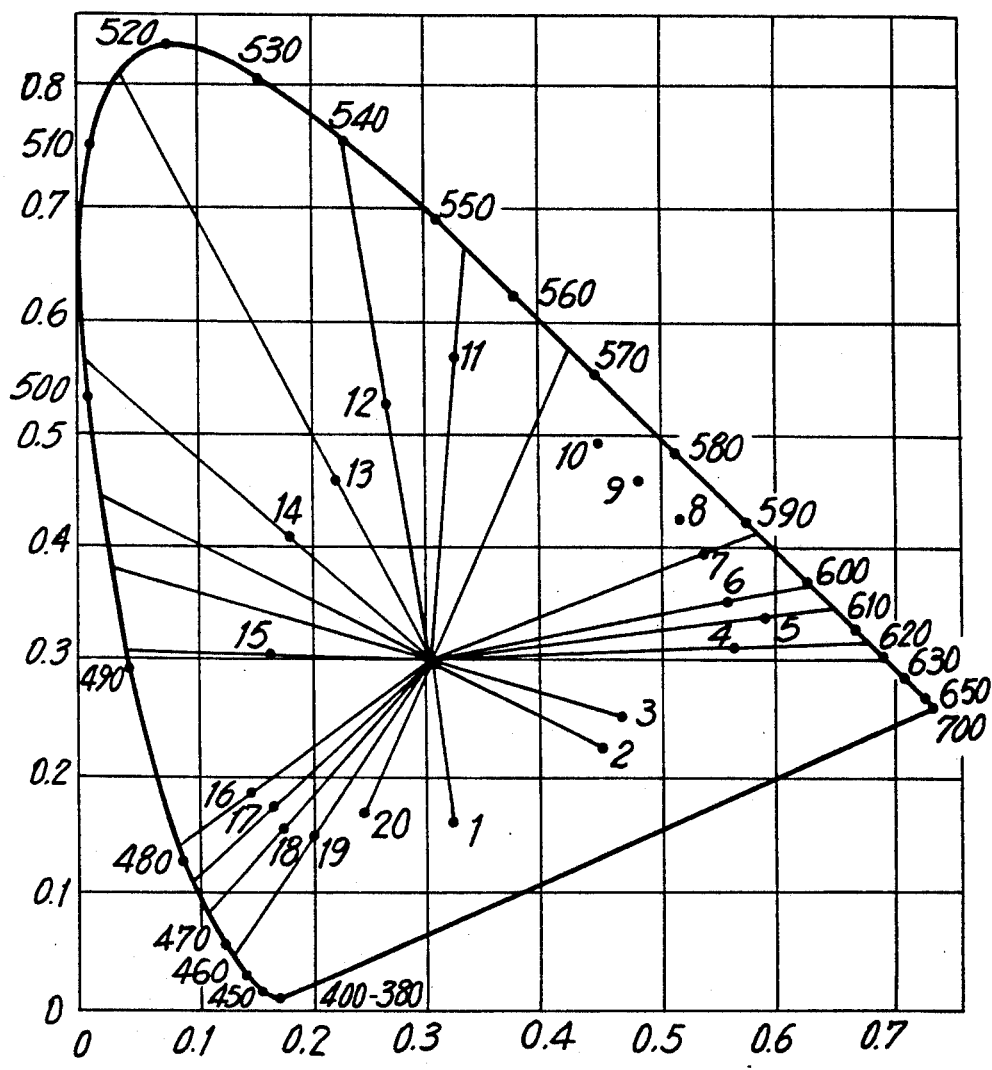
FIG. 1 is a view of a CIE Lab Color Horseshoe in accordance with my above-mentioned patent.
FIG. 2 is a chart representing typical tint strengths which may be provided for each of the hues shown in FIG. 1 to afford a useful range of tints for blending purposes.

With reference to FIG. 1, a first color group includes five variations of reds, ranging in nanometer values from 700 to 610. A second color group includes the yellows, ranging in nanometer value from 610 to 570. A third group covers the greens and ranges from 570 to 490 nanometers. A fourth color group includes the blues, ranging from 490 to 400 nanometers. The precise value of each of the hues is set forth in terms of CIE-Lab coordinates, and reference is made to FIG. 3 in the drawing to facilitate the location of these colors on the CIE-Lab chart.

|  | Hues | | |
| --- | --- | --- | --- |
| Color Number | C | M | Y |
| 1 | 30 | 100 | — |
| 2 | — | 100 | — |
| 3 | — | 100 | 30 |
| 4 | — | 100 | 60 |
| 5 | — | 100 | 100 |
| 6 | — | 80 | 100 |
| 7 | — | 60 | 100 |
| 8 | — | 40 | 100 |
| 9 | — | 20 | 100 |
| 10 | — | — | 100 |
| 11 | 50 | — | 100 |
| 12 | 100 | — | 100 |
| 13 | 100 | — | 70 |
| 14 | 100 | — | 50 |
| 15 | 100 | — | 30 |
| 16 | 100 | — | — |
| 17 | 100 | 30 | — |
| 18 | 100 | 60 | — |
| 19 | 100 | 100 | — |
| 20 | 70 | 100 | — |

It will be observed that the selected hues are close, but not exactly equally positioned with respect to color space within the color spectrum, because of the popularity of particular colors, visual spacing between hues, and the availability of suitable pigments. When basing the improved system on process colors, still further adjustment is necessary. As in the earlier system, the present system contemplates a relatively equal balance between the warm and cool colors, which colors are produced by the printer from basic process colors to form proofing and printing inks. As in the past, each of these colors has its substantial complimentary color, which is obtained by merely adding the number 10 to the warm color selected, or subtracting 10 from a cooler color. The callibrated tint values have similar visual appearance because the 100% colors are of relatively uniform density. Once selected, the tint strength can be most conveniently varied in terms of available coordinated materials. For example, where color sheets are employed, they are usually available in decade values, and a single five percent value.

In accordance with the present invention, the 20 hues are derived by the careful blending of appropriate amounts of just two of the three primary colors. By careful blending, the hues obtained very closely approximate those set forth in the disclosure in my prior patent, and by using inks having a common lot number or designation, reduplication of the desired hue is easily accomplished. In the above example, I have employed standard cyan, magenta and yellow Toyo King transparent printing inks, type Mark V, supplied by Toyo DuPont International Inc., Norwood, Massachusetts, USA. The parts designated are by volume.

It will be observed that using different brands of inks, further modification may be necessary. However, similar process affects will be obtained with other brands of cyan, magenta, and yellow offset printing inks, with the best results realized by using colors that very closely match the printing inks that were used in the above chart. Close matches can also be achieved using other transparent colorants such as fabric dyes, glazes and silk screen gravure, flexographic and other non-impact printing inks. Either together as for process effects or separately as the individual twenty basic colors.

Figure 3:
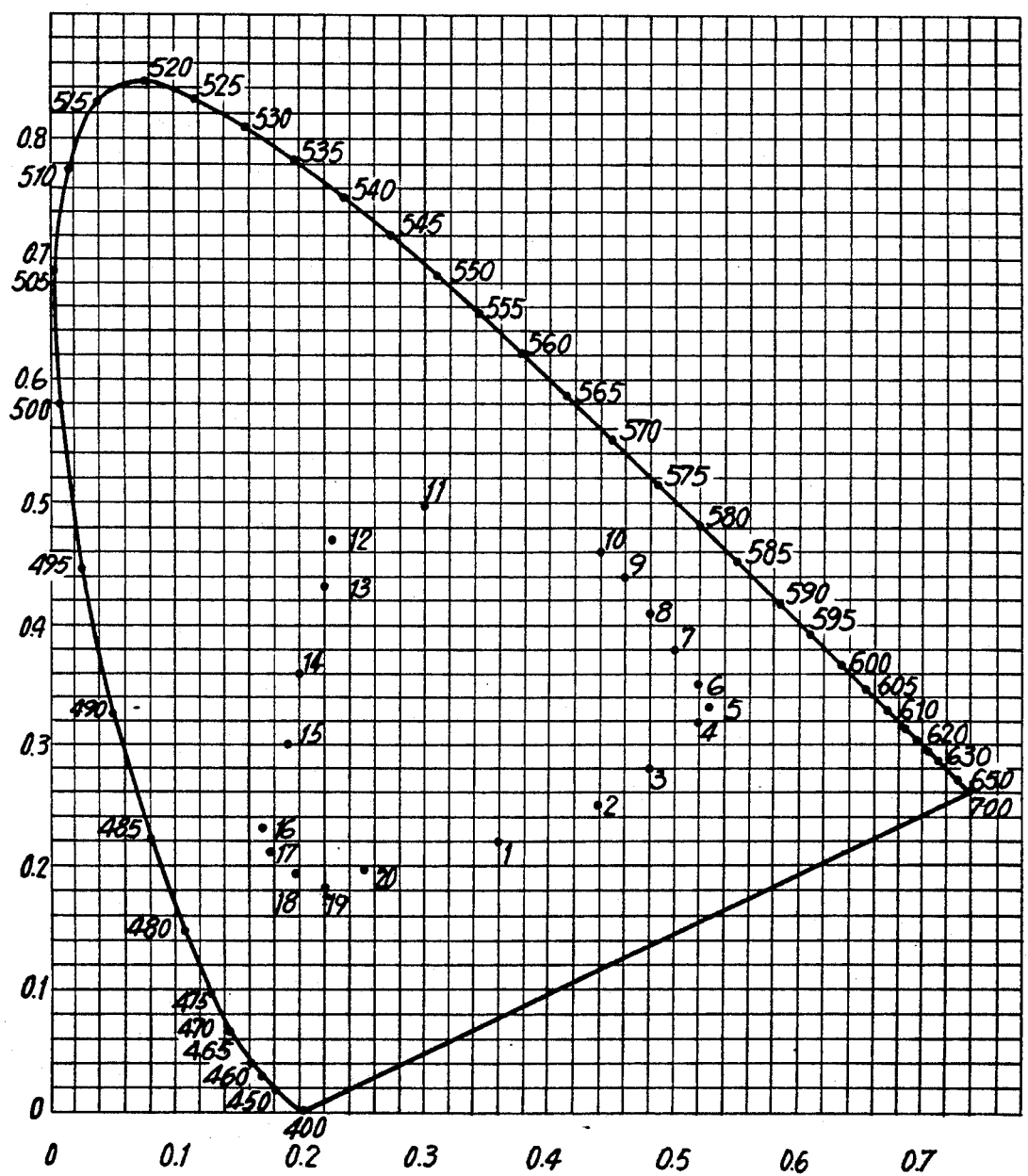
FIG. 3 is a chart showing the use of my system in conjunction with standardized cyan, magenta, and yellow printing inks which are blended to obtain substantially the hues indicated in FIG. 1.

In the known processing charts, the tint values have been proportionately reduced to achieve the lighter tones, while the tint values shown in the chart in FIG. 3 for this system, have been electronically adjusted to duplicate the visual tonal values that would be produced if the twenty colors were printed with the separate printing inks. This is particularly noticeable in the red oranges where the individual inks produce a much redder hue. Although the process reproduction uses only the cyan, magenta and yellow inks, the visual rendition is accurate for those who would want to also use them as individual colors.

With the present system, black is handled as a separate element as it is in printing. The colors of the master chart are intended to be the equivalent of benchmarks in color space, i.e. the visual spectrum which has no black. Black is used for shadow, depth, and to darken the colors. The grays (tints of black) may come in the same increments as the colors, e.g. 5, 10, 20, 30, 40, 50, 60, 70, 80, 90, and 100 percent. The black values may be indicated by a third two digit number to indicate the percentage when used as a separate color. When specified as a process color match, it is indicated as the "K" code in the CMYK data.

The colors may be identified by a series of two digit numbers. For example, 16 - 30 - 05 would indicate the color cyan (No. 16), in thirty percent tint, with five percent black. The notation 08 - XX - 00 would indicate the color amber ( No. 08), in one hundred percent (XX) tint, without a black element (00).

To facilitate a reading of FIG. 3, the following chart designates the X and Y coordinates for each of the twenty indicated values, whereby they can be compared with the values shown in FIG. 1.

|     | "X"    | "Y"    |
| --- | ------ | ------ |
| 1.  | 0.3610 | 0.2239 |
| 2.  | .4402  | .2511  |
| 3.  | .4803  | .2849  |
| 4.  | .5257  | .3233  |
| 5.  | .5362  | .3365  |
| 6.  | .5198  | .3505  |
| 7.  | .4964  | .3837  |
| 8.  | .4670  | .4286  |
| 9.  | .4421  | .4581  |
| 10. | .4235  | .4854  |
| 11. | .3035  | .4914  |
| 12. | .2349  | .4732  |
| 13. | .2223  | .4316  |
| 14. | .2065  | .3680  |
| 15. | .1900  | .3058  |
| 16. | .1734  | .2322  |
| 17. | .1874  | .2175  |
| 18. | .2047  | .1971  |
| 19. | .2278  | .1889  |
| 20. | .2559  | .1991  |

I wish it to be understood that I do not consider the invention to be limited to the exact details disclosed, for obvious modifications will occur to those skilled in the art to which the invention pertains.

I claim:

1. In an improved color system for identifying hues of specific colors to facilitate the reproduction thereof, said system consisting of four color groups, each group including five hues; a first group of hues comprising the reds and ranging in wave length from 700 to 610 nanometers; a second group of hues comprising the yellows and ranging in wave length between 610 and 570 nanometers; a third group of hues comprising the greens and ranging from 570 to 590 nanometers; and a fourth group of hues comprising the blues ranging from 490 to 400 nanometers, the improvement comprising: the basing of said hues upon standardized process colors of cyan, magenta, and yellow, said hues being derived by the blending of said process colors in accordance with the following chart:

| Color Number | Hues | | |
| --- | --- | --- | --- |
|  | C | M | Y |
| 1  | 30  | 100 | —   |
| 2  | —   | 100 | —   |
| 3  | —   | 100 | 30  |
| 4  | —   | 100 | 60  |
| 5  | —   | 100 | 100 |
| 6  | —   | 80  | 100 |
| 7  | —   | 60  | 100 |
| 8  | —   | 40  | 100 |
| 9  | —   | 20  | 100 |
| 10 | —   | —   | 100 |
| 11 | 50  | —   | 100 |
| 12 | 100 | —   | 100 |
| 13 | 100 | —   | 70  |
| 14 | 100 | —   | 50  |
| 15 | 100 | —   | 30  |
| 16 | 100 | —   | —   |
| 17 | 100 | 30  | —   |
| 18 | 100 | 60  | —   |
| 19 | 100 | 100 | —   |
| 20 | 70  | 100 | —   | wherein the indicated values represent parts by volume.

* * * * *